(12) United States Patent
Wilkes

(10) Patent No.: US 8,388,886 B2
(45) Date of Patent: Mar. 5, 2013

(54) BLOW-MOLDED PLASTIC BOTTLE AND METHOD OF MANUFACTURE

(75) Inventor: Kenneth R. Wilkes, Asheville, NC (US)

(73) Assignee: Smart Bottle, Inc., Asheville, NC (US)

( * ) Notice: Subject to any disclaimer, the term of this patent is extended or adjusted under 35 U.S.C. 154(b) by 452 days.

(21) Appl. No.: 12/813,216

(22) Filed: Jun. 10, 2010

(65) Prior Publication Data

US 2011/0303673 A1 Dec. 15, 2011

(51) Int. Cl.
*B29C 49/00* (2006.01)

(52) U.S. Cl. .......................... 264/523; 264/531

(58) Field of Classification Search .................. None
See application file for complete search history.

(56) References Cited

U.S. PATENT DOCUMENTS

| | | |
|---|---|---|
| 3,367,380 A | 2/1968 | Dickey |
| 3,380,646 A | 4/1968 | Doyen et al. |
| 3,438,567 A | 4/1969 | Bell, Jr. |
| 3,935,993 A | 2/1976 | Doyen et al. |
| 4,597,103 A | 6/1986 | Hoover |
| 5,020,692 A | 6/1991 | Darr |
| 5,316,184 A | 5/1994 | During |
| 5,511,686 A | 4/1996 | Gallay |
| 6,193,416 B1 | 2/2001 | Kawamata et al. |
| 6,679,034 B2 | 1/2004 | Kohl et al. |
| 6,722,106 B2 | 4/2004 | Bartel et al. |
| 6,729,109 B2 | 5/2004 | Knoerzer et al. |
| 6,832,852 B2 | 12/2004 | Wilkes |
| 7,147,597 B2 | 12/2006 | Wilkes |
| 7,407,326 B2 | 8/2008 | Wilkes |
| 7,546,721 B2 | 6/2009 | Rasile et al. |
| 2006/0107619 A1 | 5/2006 | Reaves et al. |
| 2006/0266728 A1 | 11/2006 | Wilkes |
| 2007/0040306 A1 | 2/2007 | Morel et al. |
| 2010/0072679 A1 | 3/2010 | Wilkes |
| 2010/0133294 A1 | 6/2010 | Chan et al. |

FOREIGN PATENT DOCUMENTS

| | | |
|---|---|---|
| EP | 0854092 A2 | 7/1998 |
| WO | 9621599 A1 | 7/1996 |

OTHER PUBLICATIONS

Notification of Transmittal of the International Search Report and the Written Opinion of the International Searching Authority dated Oct. 11, 2011 for PCT Application No. PCT/US2011/039361.

*Primary Examiner* — Monica A Huson
(74) *Attorney, Agent, or Firm* — Jones Day

(57) ABSTRACT

A plastic bottle includes an expanded blow-molding preform of plastic film. The expanded preform has a base configured to support the bottle in a free-standing upright position, a neck containing a fitment, and seams including only a single full-height seam extending from the base to the neck.

11 Claims, 11 Drawing Sheets

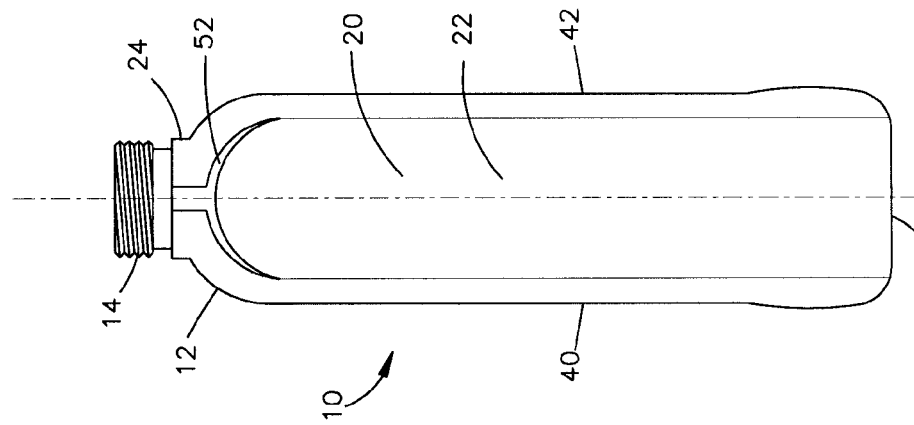
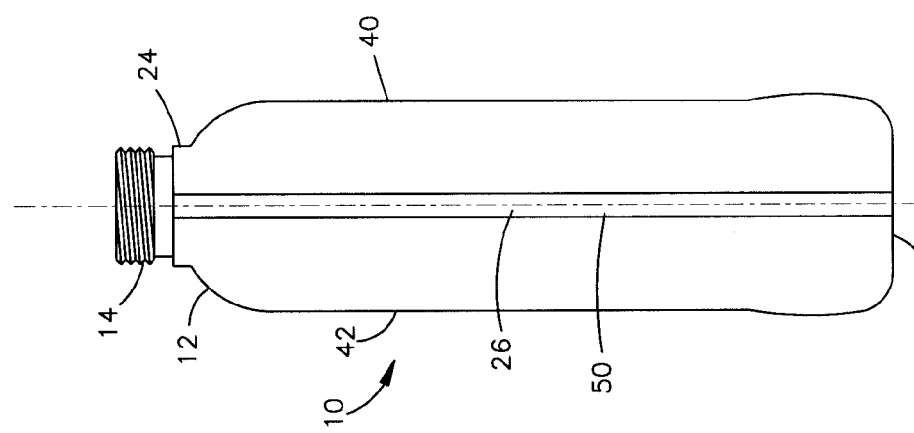
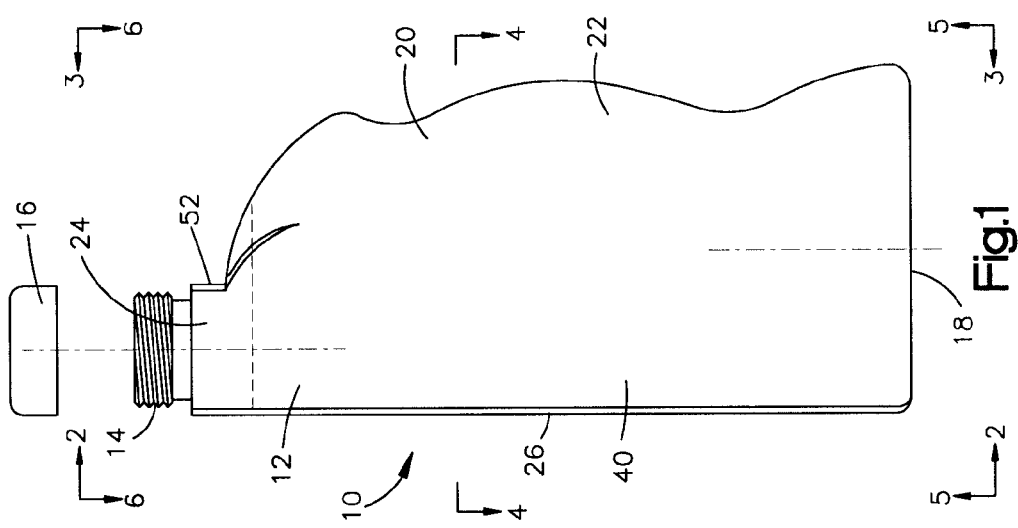

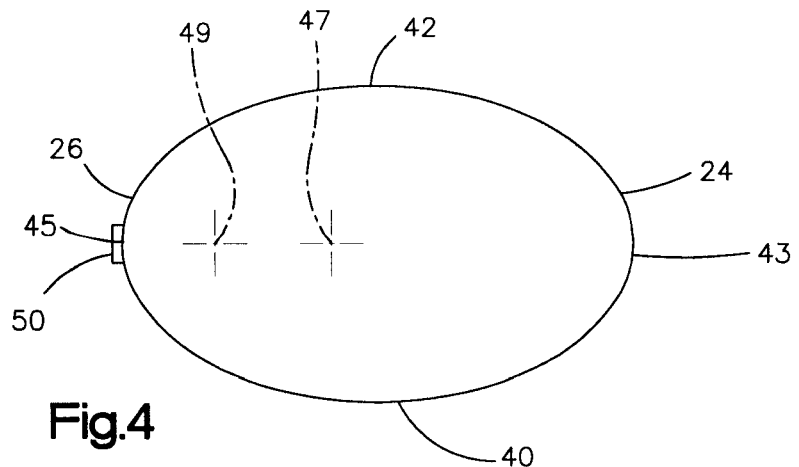
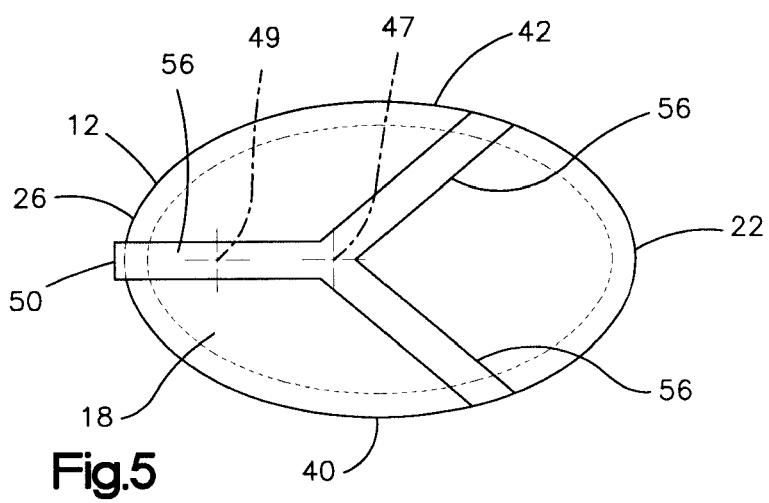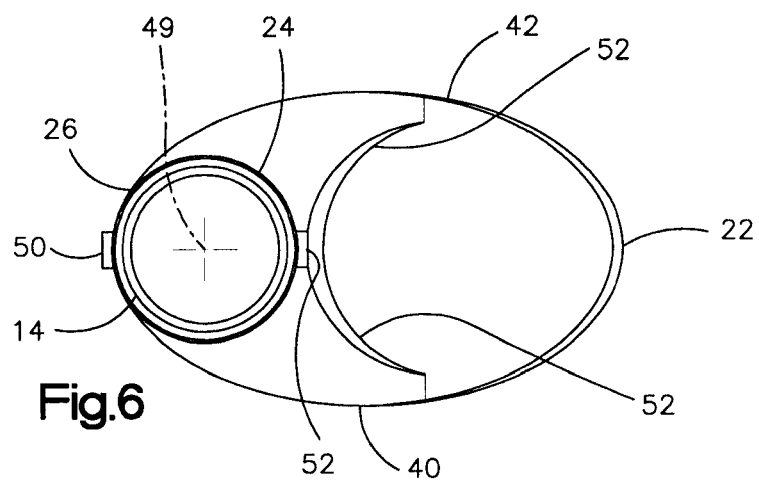

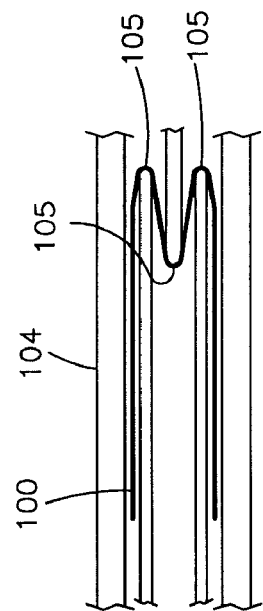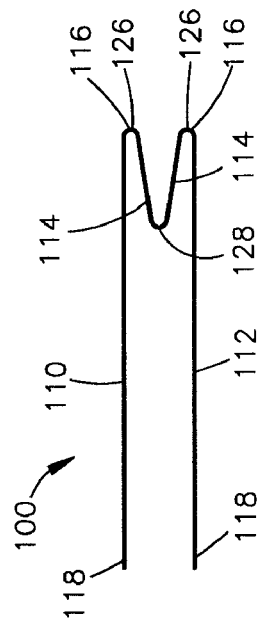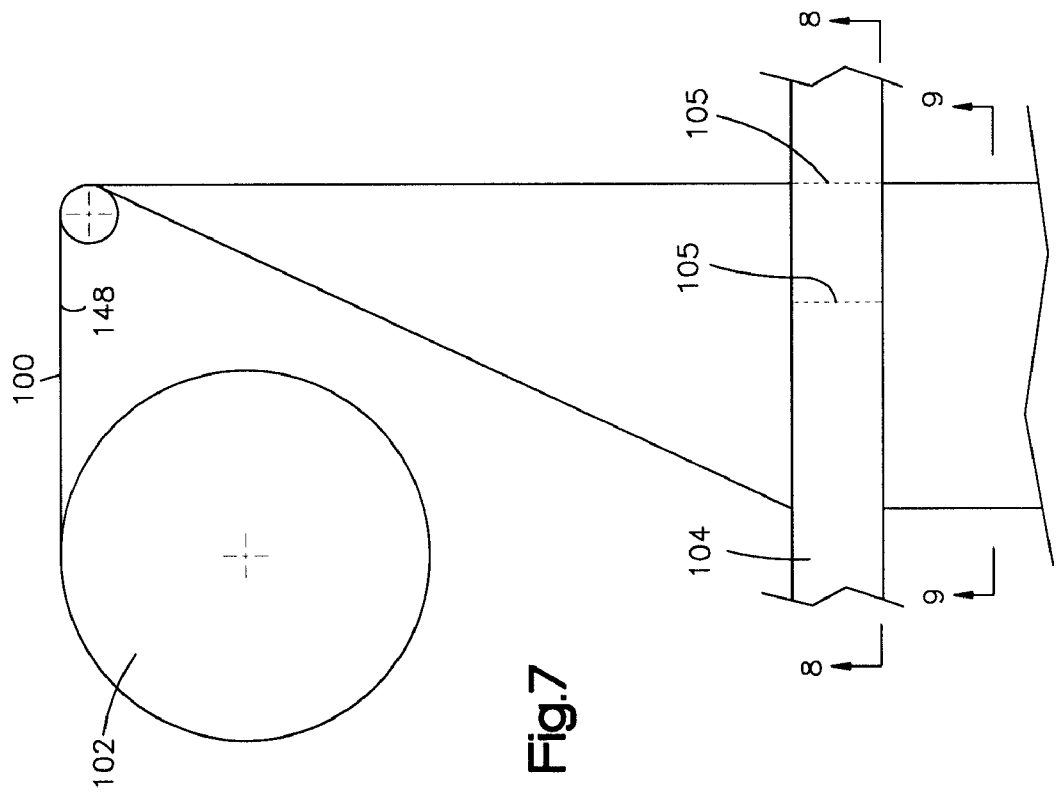

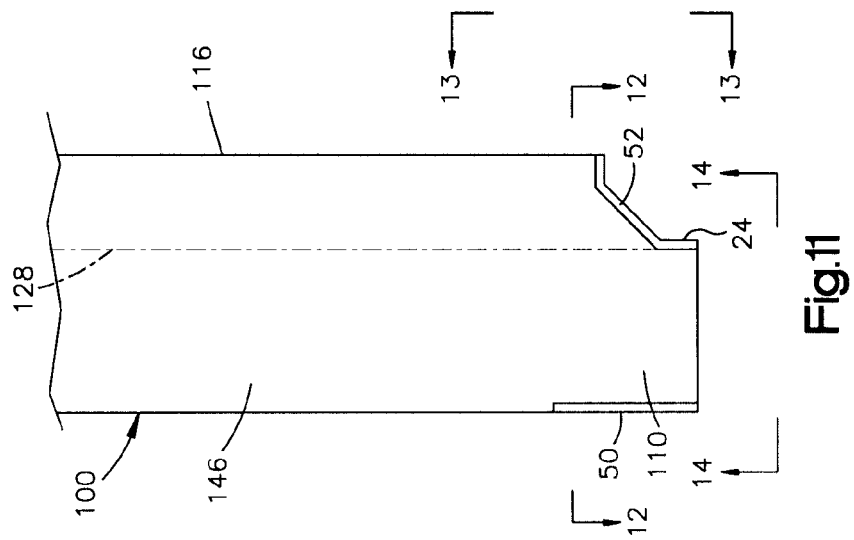
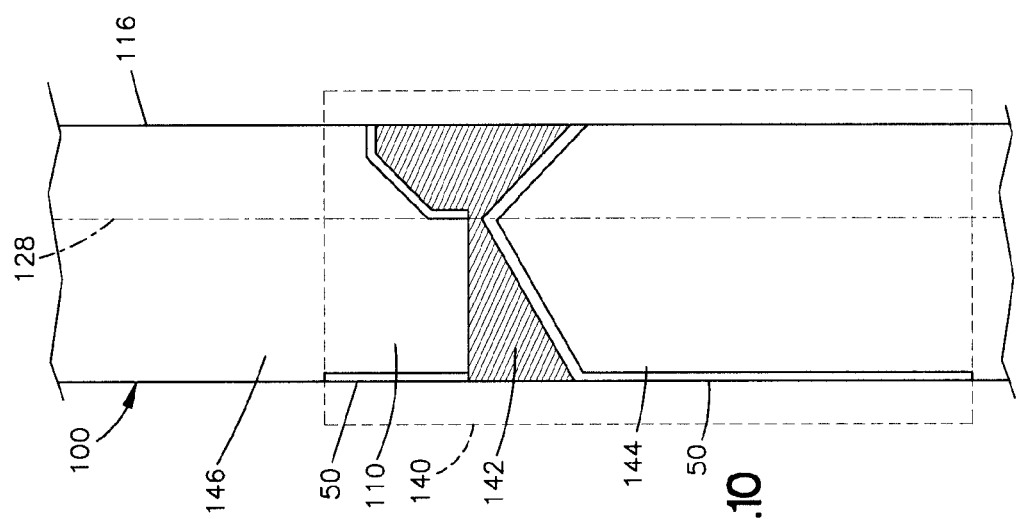

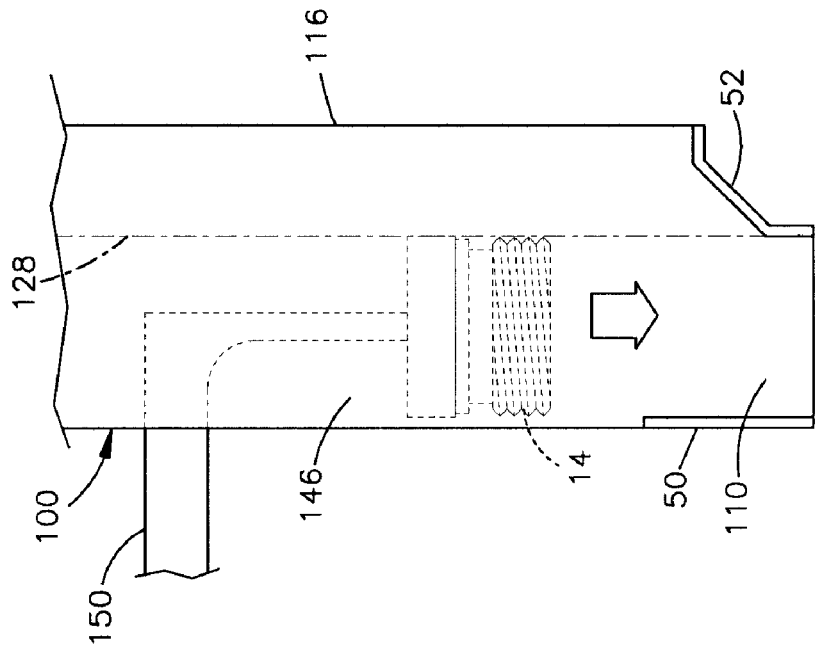
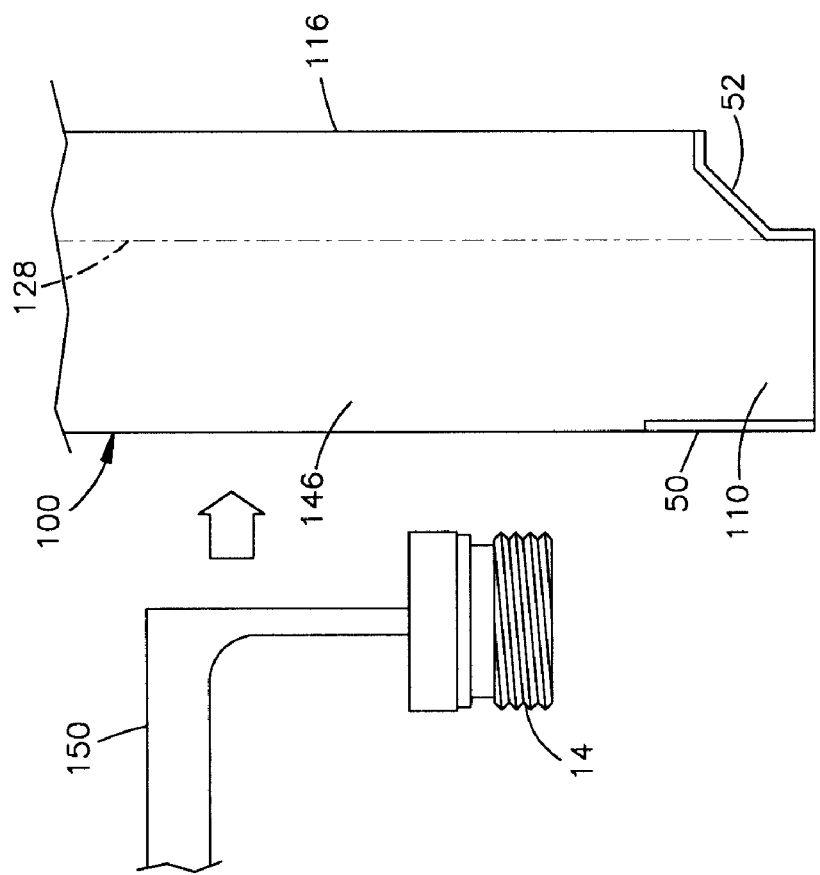

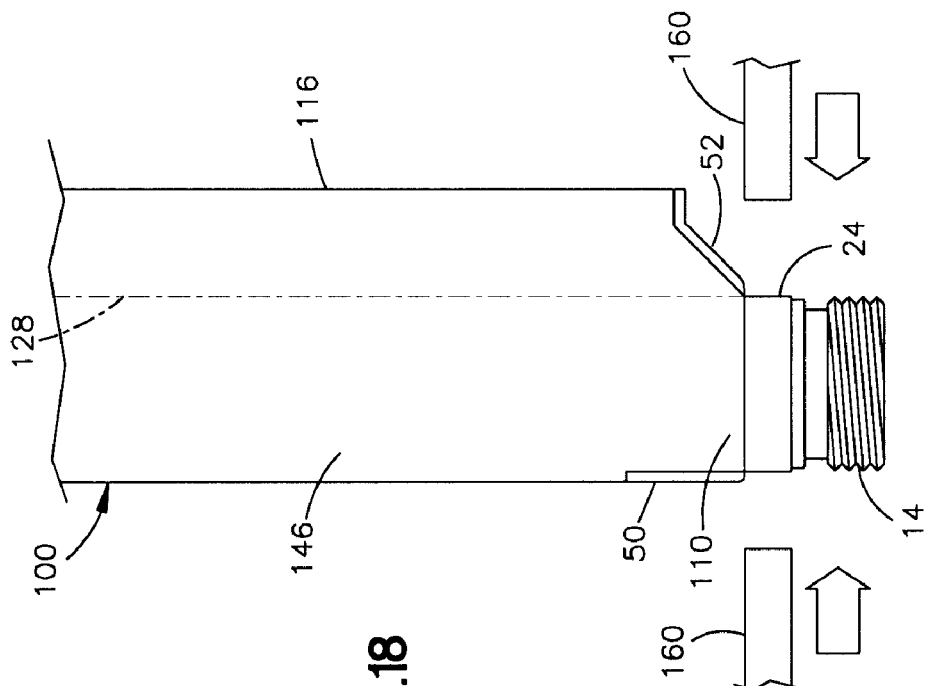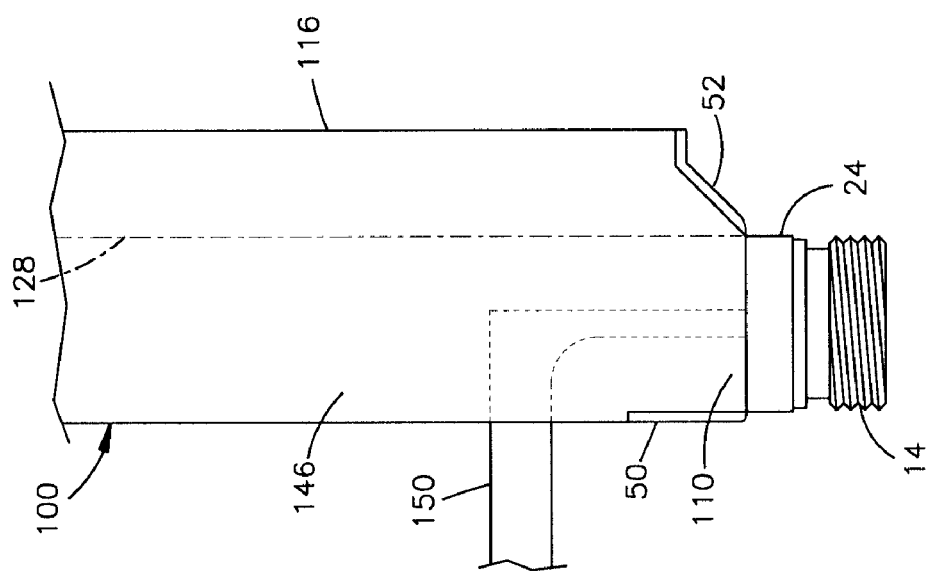

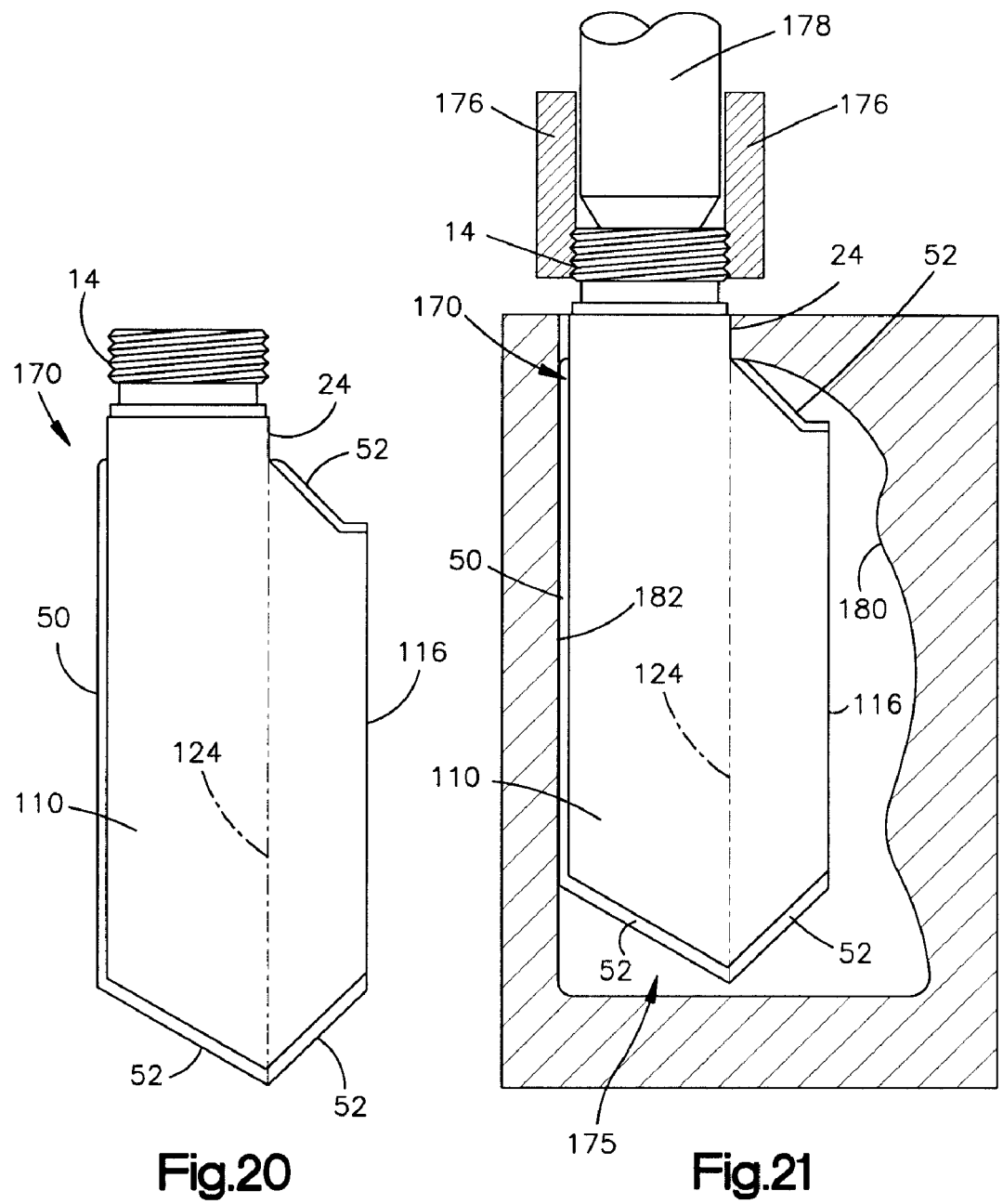

BLOW-MOLDED PLASTIC BOTTLE AND METHOD OF MANUFACTURE

TECHNICAL FIELD

This technology includes a plastic bottle that is formed by blow-molding a preform of plastic film into the shape of a bottle.

BACKGROUND

Plastic bottles can be formed from plastic film. One or more elongated webs of the plastic film are unrolled from spools, and are severed into panels that are folded and seamed together to form structures known as a preforms. Each preform corresponds to an individual bottle. A fitment may be installed in the neck of a preform to provide a spout, but the preform has a generally flat shape defined by the flat panels of plastic film. The preform is then placed inside a blow-molding cavity that has the shape of the bottle, and is expanded under fluid pressure inside the cavity. This deflects the flat sections of plastic film into the shape of the bottle.

SUMMARY OF THE INVENTION

A plastic bottle includes an expanded blow-molding preform of plastic film. The expanded preform has a base configured to support the bottle in a free-standing upright position, a neck containing a fitment, and seams including only a single full height seam extending from the base to the neck.

In a method of manufacturing the bottle, an elongated web of plastic film is folded and sealed into a four panel configuration that enables the finished bottle to have only the single full height seam. Specifically, the four panel configuration includes a front panel with right and left side edges, a back panel with right and left side edges, and a pair of gusset panels extending transversely inward from the front and back panels. A pair of folded corners join the gusset panels to the front and back panels along the right side edges. Another folded corner joins the gusset panels together. The left side edges of the front and back panels are joined together by a longitudinally extending seam. With folded corners instead of seams at each other longitudinal juncture of panels, the seam at the left side edges is the only longitudinal seam extending the full length of the four panel configuration.

When the web has been folded into the four panel configuration, a fitment is installed between forward ends of the panels. Rear ends of the panels are sealed together across the folded web. The web is then severed to obtain a blow-molding preform in the four panel configuration with a closed rear end, the fitment at a forward end, the gusset panels extending transversely inward along a right side of the preform, and the single full length seam at left side of the preform.

The preform is expanded under fluid pressure in a blow-molding cavity. The fluid pressure turns the gusset panels outward, and deflects the rear end into a base configured to support the expanded preform in a free-standing upright position.

BRIEF DESCRIPTION OF THE DRAWINGS

FIG. 1 is a front view of a blow-molded plastic bottle.
FIG. 2 is a left side view taken on line 2-2 of FIG. 1.
FIG. 3 is a right side view taken on line 3-3 of FIG. 1.
FIG. 4 is a sectional view taken on line 4-4 of FIG. 1.
FIG. 5 is a bottom view taken on line 5-5 of FIG. 1.
FIG. 6 is a top view taken on line 6-6 of FIG. 1.
FIG. 7 is schematic view showing a web of plastic film with an apparatus for manufacturing blow-molding preforms.
FIG. 8 is a sectional view taken on line 8-8 of FIG. 7.
FIG. 9 is a sectional view taken on line 9-9 of FIG. 7.
FIG. 10 is a view similar to FIG. 7 showing another part of the apparatus.
FIG. 11 is a front view showing the web of plastic film in a condition taken during the manufacturing process.
FIGS. 15-17 are views similar to FIG. 11 showing steps taken to insert a fitment into the web of plastic film.
FIG. 18 is a view similar to FIG. 15 showing another part of the apparatus.
FIG. 20 is a front view of a blow-molding preform with a fitment.
FIG. 21 is a partially sectional view showing the preform of FIG. 20 inside a blow-molding cavity.

DETAILED DESCRIPTION

Figure 12:
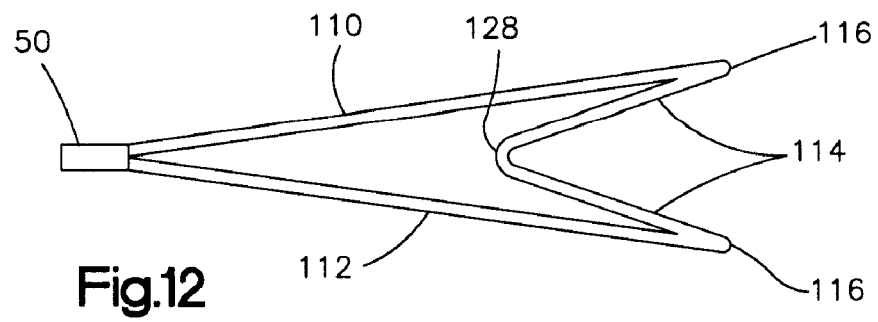
FIG. 12 is a sectional view taken on line 12-12 of FIG. 11.

A plastic bottle 10 is shown in FIG. 1. The bottle 10 is especially suitable for contents 11 such as a liquid, granular or powder laundry product. The parts of the bottle 10 include a blow-molded plastic body 12, a fitment 14, and a closure cap 16. The body 12 is vertically elongated, and has a generally flat base 18 configured to support the bottle 10 in a free-standing upright position, as shown in FIG. 1. A handgrip portion 20 of the body 12 is located at the right hand side 22, as viewed from the front in FIG. 1. The fitment 14 is installed in a neck 24 at the upper end of the body 12, and is offset toward the left hand side 26.

As further shown in FIGS. 2-3, the body 12 has front and back faces 40 and 42 extending fully throughout the height of the body 12 from the base 18 to the neck 24. As shown in FIG. 4, a horizontal cross-section of the body 12 has an oval periphery. The front and back faces 40 and 42 extend across the width of the body 12 between right and left vertices 43 and 45 of the oval periphery.

The base 18 of the body 12, as shown in FIG. 5, likewise has an oval periphery, and has a central axis 47. The fitment 14 and the neck 24 are centered on an axis 49 (FIG. 6) that is parallel but spaced to the left from the axis 47 of the base 18 such that the fitment 14 is offset to left hand side 26 of the bottle 10, as noted above. With the fitment 14 in this off-center arrangement, a user gripping the bottle 10 from the right hand side 22 can pour a stream that projects downward and outward from the fitment 14 without crossing any substantial width portion of the bottle 10.

A seam 50 also is located at the left hand side 26 of the body 12. This seam 50 is located at the left vertex 45 of the oval periphery, and extends the full height of the body 12 from the base 18 to the neck 24. Top seams 52 extend downward from the neck 24, and bottom seams 56 extend across the base 18. However, the seam 50 at the left hand side 26 is the only full height seam on the body 12 of the bottle 10. This location of the single full height seam 50 maximizes the unobstructed areas of the front and back faces 40 and 42 for printed text and images to appear across the width of the bottle 10. This location of the single full height seam 50 also provides the handgrip 20 with a smooth, seamless surface.

The body 12 of the bottle 10 is formed of plastic film. As shown in FIG. 7, an elongated web 100 of plastic film is withdrawn from a spool 102 and conveyed lengthwise through a folding station 104. In the preferred embodiment, lengths of the web 100 are incrementally pulled downward through the folding station 104. As shown in FIG. 8, the folding station 104 is configured to fold the web 100 across longitudinally extending fold lines 105 to place the web 100 in a four panel configuration.

When the web 100 has the four panel configuration, as shown separately in FIG. 9, it has a front panel 110, a back panel 112, and two gusset panels 114, all of which are elongated lengthwise of the web 110. The front and back panels 110 and 112 both have right and left side edges 116 and 118. The gusset panels 114 extend transversely inward from the front and back panels 110 and 112. A pair of folded corners 126 join the gusset panels 114 to the front and back panels 110 and 112 at the right side edges 116. Another folded corner 128 joins the gusset panels 114 together. At this stage of the process, the front and back panels 110 and 112 are unattached at the left side edges 118.

In the next step of the process, a seaming press 140 (shown schematically in FIG. 10) engages the web 100 in the four panel configuration. The seaming press 140 severs a section 142 from the web 100 to separate a leading section 144 from a trailing section 146. At the trailing section 146 of the web 100, the seaming press 140 seals the front and back panels 100 and 112 together along their left side edges 118 to form a short section of the side seam 50. As shown in FIGS. 11 and 12, this section of the partially formed seam 50 has a length extending longitudinally along the web 100, and has a width projecting transversely outward from unattached portions of the front and back panels 110 and 112. An inner surface 148 (FIG. 7) of the web 110 is treated beforehand to ensure that only inner surfaces of the four-panel configuration are bonded together by the seaming press 140. Alternatively, the seams could be formed ultrasonically, in which case the surface treatment would not be necessary.

Figure 13:
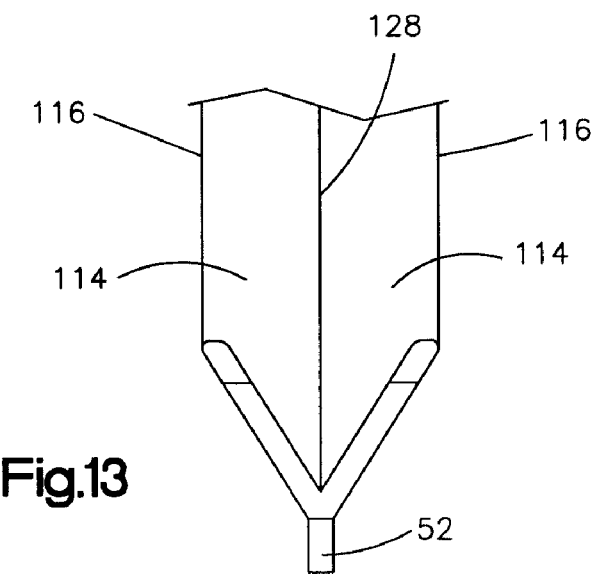
FIG. 13 is a side view taken on line 13-13 of FIG. 11.
Figure 14:
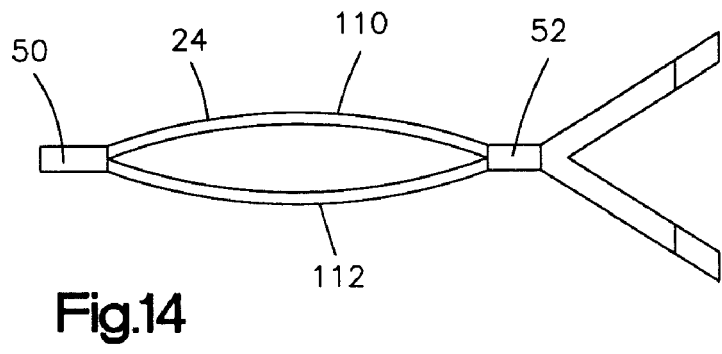
FIG. 14 is an end view taken on line 14-14 of FIG. 11.

The seaming press 140 also forms top seams 52 on the trailing section 146 of the web 100. As shown in FIGS. 11, 13 and 14, the top seams 52 extend across the ends of the gusset panels 14. This provides an open neck 24 at the forward end of the trailing section 146.

The fitment 14 is inserted in the trailing section 146 of the web 100 as shown in FIGS. 15-17. Specifically, the fitment 14 is inserted between the front and back panels 110 and 112 from the side, and is moved downward into the neck 24. The relatively short length of the partially formed side seam 50 provides clearance for a fitment insertion tool 150 to move downward within the trailing section 146 of the web 110 to reach the neck 24. Heat-sealing clamps 160 (FIG. 18) are moved into engagement with the neck 24 to seal the fitment 14 in its installed position in the neck 24. The clamps 160 also fold the seams 50 and 52 inward against the neck 24 so that the seams 50 and 52 no longer project transversely outward at the neck 24.

Figure 19:
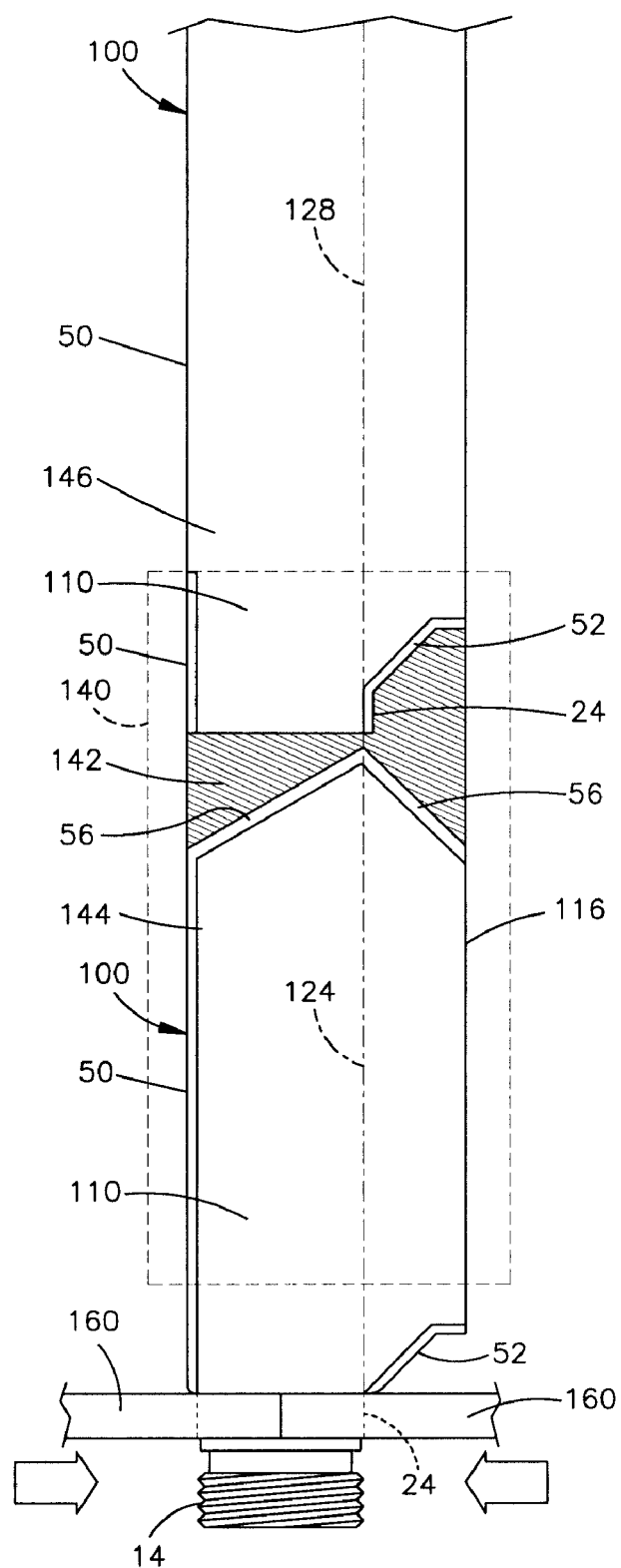
FIG. 19 is a view similar to FIG. 10 showing the web of plastic film in a subsequent condition taken during the manufacturing process.

In the following step, the clamps 160 pull the web 100 downward so that the prior trailing section 146 becomes the next leading section 144, as shown in FIG. 19. The next cycle of the seaming press 140 seals the front and back panels 110 and 112 together to form the remainder of the side seam 50 at the leading section 144. The seaming press 140 also the panels 100, 112 and 114 of the leading section 146 together at their rear ends by forming bottom seams 56 across the web 110. This repeats each time the web 100 is pulled downward so that each successive cycle of the seaming press 140 yields a blow-molding preform 170 with a fitment 14 and only a single full length seam 50, as shown separately in FIG. 20.

The bottle 10 of FIG. 1 is formed by expanding the preform 170 in a mold cavity 175 (FIG. 21) having the shape of the body 12. Grippers 176 press the fitment 14 into pressure-tight engagement with a filler 178 that communicates with a source pressurized fluid. The pressurized fluid is then directed into the preform 170 to deflect the panels 110, 112 and 114 into the shape of the cavity 175.

The fluid pressure turns the gusset panels 114 outward, and presses them against an opposed inner surface 180 of the mold cavity 175. The inner surface 180 has an undulating vertical profile for the handgrip 20 at the right hand side 22 of the body 12. The inner surface 180 also has a non-circular, concave horizontal profile for the right vertex 43 (FIG. 4) of the oval periphery. An opposite inner surface 182 of the mold cavity 175 has a non-circular, concave horizontal profile for the left vertex 45, but has a more linear vertical profile. When the preform 170 is inserted in the mold cavity 175, the panels 110, 112 and 114 are registered with the mold cavity 175 such that the side seam 50 is centered on the concave inner surface 182. This ensures that the side seam 50 is centered at the left-hand side 26 of the body 12, as described above.

Deflection of the panels 110, 112 and 114 outward within the mold cavity 175 draws the lower end portions of the panels 110, 112 and 114 upward to form the base 18 of the body 12. Importantly, the fluid pressure also presses the projecting sections of the side and top seams 50 and 52 outward against the opposed mold cavity surfaces. This folds those seams 50 and 52 inward to lie flat against an adjoining outer surface of the body 12.

Figure 22:
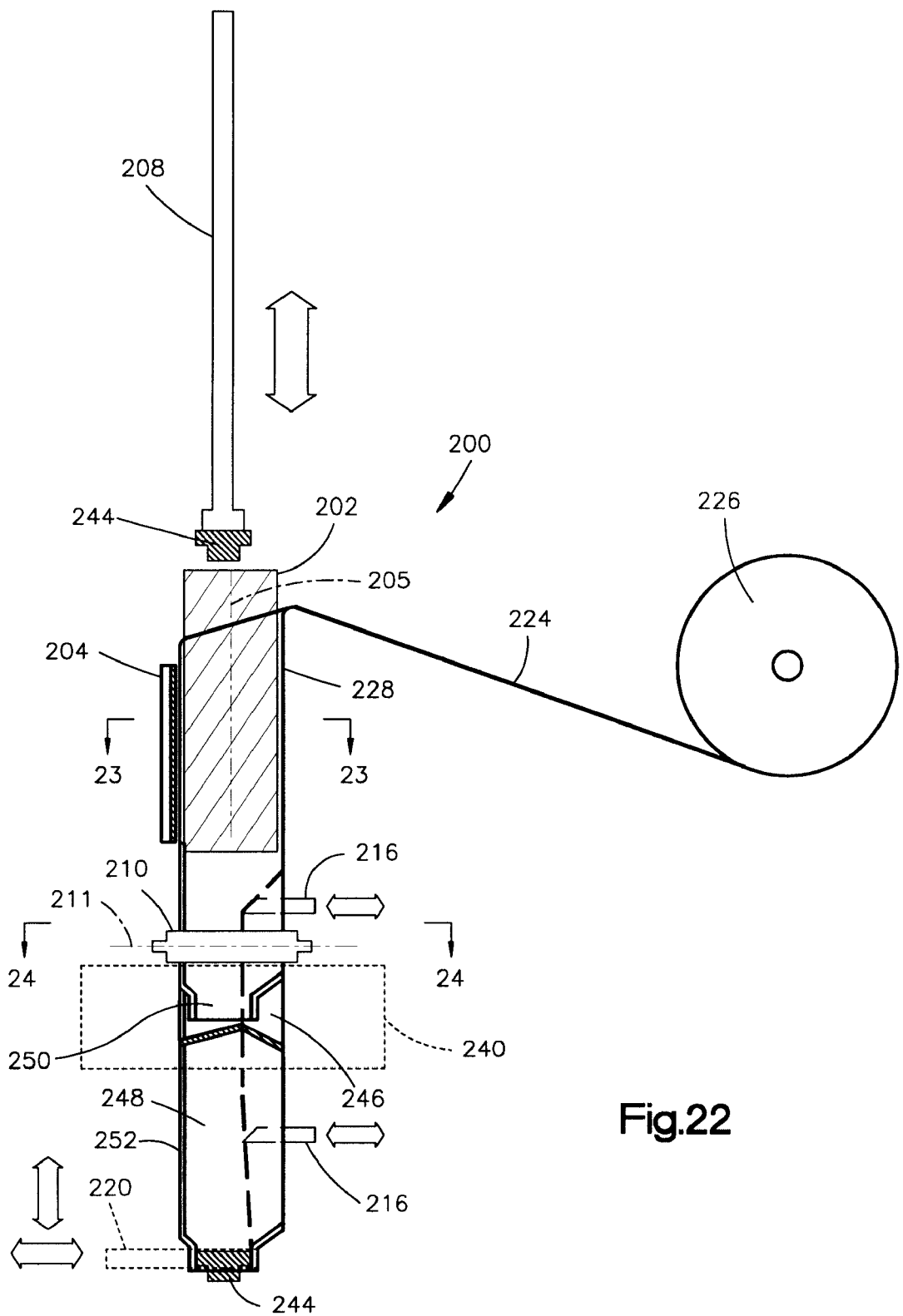
FIG. 22 is a schematic view of another apparatus for manufacturing blow-molding preforms.

The schematic view of FIG. 22 shows parts of another apparatus for manufacturing a preform to be blow-molded into a bottle with only a single full height seam. This apparatus 200 includes a tube 202 with a bar sealer 204. The tube 202 is a cylinder with a circular cross-section centered on a vertical axis 205. The bar sealer 204 extends vertically alongside the tube 202. A fitment insertion tool 208 is arranged above the tube 202 for vertical movement through the tube 202.

A pair of rollers 210, one of which is shown in FIG. 22, are arranged beside each other beneath the tube 202. The rollers 210 are alike and are rotatable about parallel horizontal axes 211. A first gusset finger 216 is located above the rollers 210, and a second gusset finger 216 is located below the rollers 210. A neck sealer clamp 220 has a range of movement vertically and horizontally beneath the rollers 210, as indicated by the arrows shown in FIG. 22.

Figure 23:
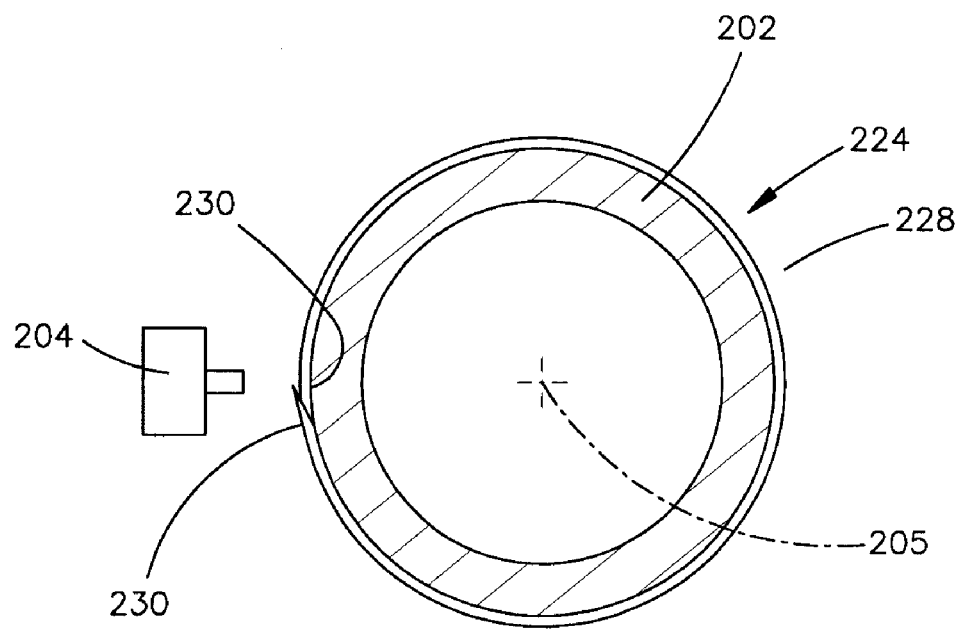
FIG. 23 is a sectional view taken on line 23-23 of FIG. 22.

A web 224 of plastic film extends from a spool 226 to the tube 202. The web 224 is guided over the outside of the tube 202 so that a section 228 of the web 224 is wrapped around, and extends downward over, the tube 202. That section of the web 224 is thus shaped as a cylinder with a circular cross-section centered on the vertical axis 205, as shown in FIG. 23. Also shown in FIG. 23 are unattached edge portions 230 of the web 224 at the cylindrical section 228. The unattached edge portions 230 overlap circumferentially, and extend axially alongside the bar sealer 204.

The web 224 extends downward from the tube 202 past the first gusset finger 216, and through a nip between the rollers 210. Also shown schematically in FIG. 22 is a seaming press 240 beneath the rollers 210. The web 224 extends further downward past the seaming press 240 and the second gusset finger 216. The lower end of the web 224 contains a fitment 244 when the web 224 has the condition shown in FIG. 22.

In operation of the apparatus 200, the bar sealer 204 moves radially inward against the overlapping edge portions 230 of the web 224 to form a longitudinally extending seam at which the overlapping edge portions 230 are joined together. The seaming press 240 then acts upon the web 224 to sever a section 246 from the web 224, and also to form seams extending across the web 224. As in the method described above, this step yields a completed blow-molding preform 248 at the leading section of the web 224. This step also forms top seams and a neck 250 at the trailing section of the web 224.

In the next step, the fitment insertion tool 208 is advanced downward through the tube 202 and into the newly formed neck 250 to install the next fitment 244. The rollers 210 are moved apart from each other, and the first gusset finger 216 is retracted, to provide clearance for the fitment insertion tool 208 to be inserted and retracted. Like the fitment 14 described above, the fitment 244 is off-center. Accordingly, the fitment insertion tool 208 is advanced and retracted though the cylindrical tube 202 along a linear path that is radially offset from the central axis 205.

Figure 24:
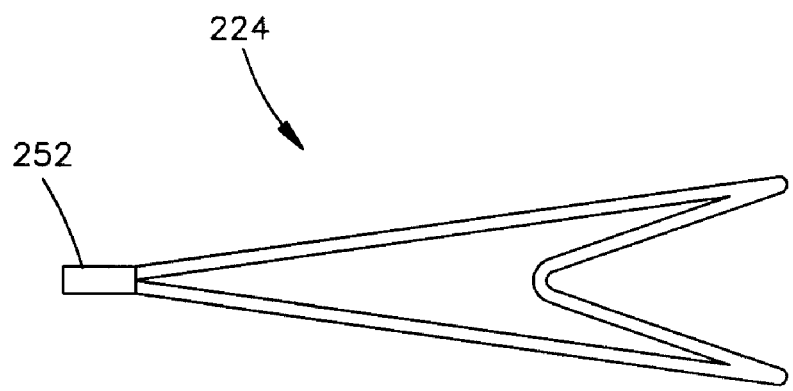
FIG. 24 is a sectional view taken online 24-24 of FIG. 22.

When the next fitment 244 has been inserted, the neck sealer clamp 220 grasps the neck 250 containing the fitment 244, and pulls the web 224 downward so that the web 224 again takes the condition shown in FIG. 22. The second gusset finger 216 can be retracted as needed for the passage of the fitment 244. This step draws the cylindrical section 228 of the web 224 downward from the tube 202. The gusset fingers 216 impart the longitudinally extending fold lines about which the moving web 224 is folded into the four panel configuration shown in FIG. 24. Unlike the four panel configuration of the web 100 shown in FIG. 12, which has a partially formed side seam 50, the four panel configuration of the web 224 has a fully formed side seam 252. This is because the entire length of the side seam 252 is provided by a single cycle of the bar sealer 204 at the tube 202. The next cycle of the seaming press 240 then yields the next blow-molding preform 248 with an installed fitment 244 and a single full length seam 252.

This written description sets forth the best mode of carrying out the invention, and describes the invention so as to enable a person skilled in the art to make and use the invention, by presenting examples of the elements recited in the claims. The patentable scope of the invention is defined by the claims, and may include other examples that occur to those skilled in the art. Such other examples, which may be available either before or after the application filing date, are intended to be within the scope of the claims if they have elements that do not differ from the literal language of the claims, or if they have equivalent elements with insubstantial differences from the literal language of the claims.

The invention claimed is:

1. A method comprising:
    folding and sealing an elongated web of plastic film into a four panel configuration including a front panel with right and left side edges, a back panel with right and left side edges, and a pair of gusset panels extending transversely inward from the front and back panels, with a pair of folded corners joining the gusset panels to the front and back panels along the right side edges, with another folded corner joining the gusset panels together, and with the left side edges joined together by a longitudinally extending seam;
    inserting a fitment between forward ends of the panels;
    sealing rear ends of the panels together across the folded web;
    severing the folded web to obtain a blow-molding preform in the four panel configuration with a closed rear end, the fitment at a forward end, the gusset panels extending transversely inward along a right side of the preform, and the longitudinally extending seam at a left side of the preform;
    placing the preform in a mold cavity; and
    expanding the preform under fluid pressure that turns the gusset panels outward, and deflects the rear end into a base configured to support the expanded preform in a free-standing upright position.

2. A method as defined in claim 1 wherein the web is folded and sealed into the four panel configuration by folding the web to provide the front panel, the back panel, the gusset panels and the folded corners, with the front and back panels unattached at the left side edges, and by subsequently sealing the front and back panels together along the left side edges to provide the longitudinally extending seam.

3. A method as defined in claim 1 wherein the fluid pressure presses the front and back panels against a noncircular concave mold cavity surface to form a noncircular convex edge of the expanded preform at which the folded seam defines a juncture between the front and back panels.

4. A method as defined in claim 1 wherein the fluid pressure expands the preform into a configuration having a cross-section with an oval periphery, with the folded seam located at a vertex of the oval periphery.

5. A method as defined in claim 1 wherein the fluid pressure presses the gusset panels against an undulating mold cavity surface to form a handgrip portion of the expanded preform.

6. A method as defined in claim 1 wherein the fluid pressure expands the preform into a configuration having an off-center neck.

7. A method comprising:
    moving an elongated web of plastic film in a lengthwise direction;
    folding the moving web across longitudinally extending fold lines to place the moving web in a four panel configuration including a front panel with right and left side edges, a back panel with right and left side edges, and a pair of gusset panels extending transversely inward from the front and back panels, with a pair of folded corners joining the gusset panels to the front and back panels along the right side edges, with another folded corner joining the gusset panels together, and with the front and back panels unattached at the left side edges;
    sealing the front and back panels together along the left side edges to form a longitudinally extending seam with a width projecting transversely outward from unattached portions of the front and back panels;
    inserting a fitment between forward ends of the panels;
    sealing rear ends of the panels together across the folded web; and
    severing the folded web to obtain a blow-molding preform in the four panel configuration with a closed rear end, the fitment at a forward end, the gusset panels extending transversely inward along a right side of the preform, and the longitudinally extending seam projecting transversely outward along a left side of the preform.

8. A method as defined in claim 7 further comprising:
    placing the preform into a mold cavity; and
    expanding the preform under fluid pressure that turns the gusset panels outward, deflects the rear end into a base configured to support the expanded preform in a free-standing upright position, and presses the longitudinally extending seam outward against a mold cavity surface so as to fold the longitudinally extending seam inward to lie flat against an adjoining outer surface of a front or back panel.

9. A method comprising:

wrapping an elongated web of plastic film around a tube to form a tubular section of the web with overlapping edge portions;

sealing the overlapping edge portions of the tubular section together to form a longitudinally extending seam;

folding the tubular section across longitudinally extending fold lines to form a folded section of the web with a four panel configuration including a front panel with right and left side edges, a back panel with right and left side edges, and a pair of gusset panels extending transversely inward from the front and back panels, with a pair of folded corners joining the gusset panels to the front and back panels along the right side edges, with another folded corner joining the gusset panels together, and with the left side edges joined together by the longitudinally extending seam;

inserting a fitment between forward ends of the panels;

sealing rear ends of the panels together across the folded section of the web;

severing the folded section from the web to obtain a blow-molding preform in the four panel configuration with a closed rear end, the fitment at a forward end, the gusset panels extending transversely inward along a right side, and the longitudinally extending seam at a left side.

10. A method as defined in claim 9 wherein the tube has circular cross-section with a longitudinal central axis, and the fitment is inserted between the forward ends of the panels by moving the fitment into and through the tube along a path radially offset from the axis.

11. A method as defined in claim 9 further comprising:

placing the preform into a mold cavity; and expanding the preform under fluid pressure that turns the gusset panels outward, and deflects the rear end into a base configured to support the expanded preform in a free-standing upright position.

* * * * *